United States Patent
McCarthy et al.

[11] 3,901,580
[45]* Aug. 26, 1975

[54] LASER INSTRUMENT FOR VIEWING THROUGH DENSE ATMOSPHERES

[76] Inventors: Denis L. McCarthy, 3008 Avenue M, Brooklyn; Joseph D'Albert, 10 Patricia Rd., Long Island City, both of N.Y. 11210

[*] Notice: The portion of the term of this patent subsequent to July 10, 1990, has been disclaimed.

[22] Filed: May 4, 1973

[21] Appl. No.: 357,491

Related U.S. Application Data

[63] Continuation-in-part of Ser. No. 79,082, Oct. 8, 1970, Pat. No. 3,744,874.

[52] U.S. Cl. .................................... 350/96 B
[51] Int. Cl. .................................... G02b 5/16
[58] Field of Search ............ 350/96 B, 161; 356/4, 5

[56] References Cited
UNITED STATES PATENTS

| | | |
|---|---|---|
| 3,096,767 | 7/1963 | Gresser et al. ............... 350/236 X |
| 3,183,347 | 5/1965 | Coelho ........................ 350/272 X |
| 3,216,778 | 11/1965 | Davies et al. ................ 350/96 B X |
| 3,294,002 | 12/1966 | Vitkine ....................... 95/11.5 |
| 3,380,358 | 4/1968 | Neumann ..................... 95/11.5 |
| 3,504,984 | 4/1970 | Bush .......................... 350/96 B X |
| 3,689,156 | 9/1972 | Kerpchar ..................... 356/5 |

*Primary Examiner*—David H. Rubin
*Attorney, Agent, or Firm*—Eliot S. Gerber

[57] ABSTRACT

Fire fighting apparatus, to enable fire fighters to see through smoke, includes a mask or goggles which fit over the eyes. The goggles are optically connected, preferably by fiber-optics, to a laser system. The laser device includes a laser, an electronic oscillator to pulse the laser at a high fixed and selected frequency, and a beam splitting optical mechanism which couples the laser beam to the fiberoptical bundle for direct sighting of the objective along the laser beam.

4 Claims, 3 Drawing Figures

PATENTED AUG 26 1975 3,901,580
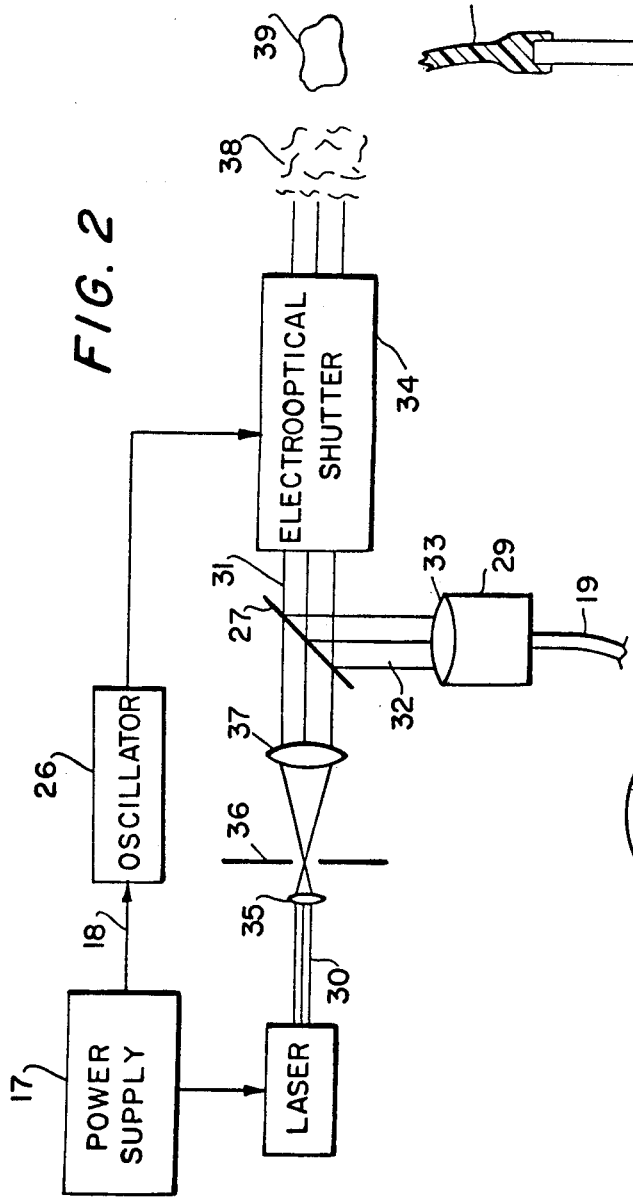
FIG. 1
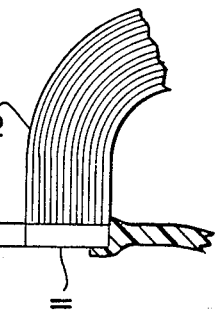
FIG. 3
FIG. 2

LASER INSTRUMENT FOR VIEWING THROUGH DENSE ATMOSPHERES

BACKGROUND OF THE INVENTION

This application is a continuation-in-part application based upon U.S. Pat. application Ser. No. 79,082, filed Oct. 8, 1970, and entitled "Portable Viewer For Fire Fighting Apparatus" now U.S. Pat. No. 3,744,874, issued July 10, 1973.

One of the greatest problems in fighting fires is that of smoke. At the present time the adverse effects of smoke on breathing are combatted by an oxygen breathing apparatus similar to that employed by scuba divers, one of the best known of these being the "Scott Pack," named after its manufacturer. These devices consist of a mask which fits over the fire fighter's face and which is connected by a tube to an oxygen supplying bottle which he carries on his back. Using such a breathing apparatus, he may enter a smoke-filled room and breathe up to 20 minutes using the oxygen supply on his back. However, the breathing apparatus does not help with the second major adverse effect of smoke, namely, that of decreased vision. For as when a fire fighter enters a smoke-filled room, he may be unable to see dangerous objects such a stairwells, which could lead to his death or injury. Similarly, he is often unable to see persons within the room who need to be evacuated, he cannot see the doors, and he cannot see the fire. In certain situations, for example, in submarines and other closed environments, it is essential that the fire (which is usually the source of the smoke) be rapidly located. If it is not, it cannot be extinguished and the smoke may continue to billow up, endangering the lives within the submarine.

The smoke problem, as it relates to decreased vision, has become increasingly serious due to the many occasions in which fires occur in industrial buildings or locations having machinery. In these instances the fires often produce a thick and oily smoke which decreases vision considerably more than a white smoke produced from a wood-burning fire. For example, a black, heavy and thick smoke may be produced by the burning of oil, rags or plastic or rubber compounds. In these situations, for example, in a fire in an industrial plant, it may be almost impossible to see within the plant, so that the fire must be fought from outside blindly. This may be extremely dangerous when the fire fighter is not aware of dangerous conditions within the plant and may consequently use the wrong material, for example, he may use water when he should be using foam.

There have been no successful efforts to enable fire fighters to see through smoke. The use of goggles, while it decreases eye irritation, does not aid in seeing through the smoke. The use of a "Scott Pack" or other breathing apparatus enables the fire fighter to keep low to the ground where the smoke is less thick but again does not directly aid his vision.

SUMMARY OF THE INVENTION

The present invention relates to fire fighting apparatus and more particularly to such apparatus which will enable the fire fighter to see through smoke. The apparatus of the invention includes a mask or goggles which fit over the fire fighter's eyes. These gogles may be built in as an integral unit with the mask which he uses as a breathing apparatus. The goggles are optically coupled to a laser-electronics instrument, such optical coupling preferably occurring by means of two bundles of flexible fiber-optics, each bundle consisting of a large number of individual strands of flexible glass which are oriented exactly the same at both its faces. The lower ends of the fiber-optic bundles terminate in a box which is hand-held with a strap so that it may be let go of for life saving. The box contains a laser, an electronic circuit and a beam splitting optical mechanism. The laser and electronic circuit are connected to a source of power, preferably a battery pack, which is carried on the fire fighter's back and which may be physically associated with the oxygen supply container as part of a single strapped-on unit. The laser is pulsed at a very high frequency, for example, 1 million Hz, to decrease the adverse effect of back-scatter from the smoke particles. The laser beam has within it an optical beam splitting mechanism, preferably a thin-film dielectrically coated optical quality glass beam splitter which enables the beam to pass through and which also enables the fiber-optic bundles to see within the beam.

It is the objective of the present invention to produce a fire fighting apparatus which will enable the fire fighter to see through smoke. The apparatus: (1) is sufficiently light in weight so that it may be carried by individual fire fighters; (2) is sufficiently economical in power consumption so that a fire fighter may spend at least 20 minutes within a smoke-filled environment without the recharging or replacement of the power source; (3) is sufficiently powerful so that it may penetrate dense smoke such as is produced by a diesel-oil fire; (4) presents a sufficiently wide beam so that objects and distance may be correctly and accurately perceived; (5) presents a sufficiently modulated beam so that back-scatter of the laser beam will not prevent vision or distort vision.

BRIEF DESCRIPTION OF THE DRAWINGS

Other objectives of the present invention will be apparent from the following detailed description of a preferred embodiment which is taken in conjunction with the accompanying drawings. In the drawings:

FIG. 1 is a perspective view of the fire fighting apparatus of the present invention and shows in dotted outline form its physical association with oxygen breathing apparatus;

FIG. 2 is a block diagram of the circuit of the present invention; and

FIG. 3 is an enlarged side cross-sectional view of the bi-focal eye piece.

DESCRIPTION OF THE PREFERRED EMBODIMENT

As shown in FIG. 1, the apparatus includes a face mask 10 which is adapted to fit over the face of the fire fighter by means of the adjustable strap 13. The face mask has a breathing tube 14 whose end terminates within the mask near the mouth of the fire fighter. THe breathing tube 14 leads to an air supply 15, the breathing tube and air supply being similar to a scuba diver's breathing apparatus. A suitable breathing apparatus and air supply is sold by the Scott Air Pack Company under the name "Scott Air Pack." The air pack 15 is adapted to be carried on the back of the fire fighter by means of the strap 16 which fits over the fire fighter's shoulder. The air pack 15 is the air supply means for the fire fighter and generally consists of a tank of compressed air and a regulating valve. Alternatively, the air supply may be a regenerative unit which recirculates the air to and from the fire fighter. The air supply means contains chemicals to lower the carbon dioxide in the air breathed out, if necessary add oxygen, and recirculate the air expelled by the breathing of the fire fighter. A holding mechanism holds the air supply 15 together with the power supply 17 so that they may both be carried on the back of the fire fighter by means of strap 16.

The power supply 17 is connected by means of a power supply line 18 to the laser and circuit container 22. The laser and circuit container 22 is adapted to be hand-carried by a handle 23. The fire fighter may also loosely hold the laser and circuit control 22 by means of the strap 24.

The mask has a left eye piece 11 and a right eye piece 12. A left fiber-optic bundle 19 is connected to the left eye piece 11 and a right fiber-optic bundle 20 is connected to the right eye piece. The eyes of the fire fighter are consequently looking into the polished glass ends of the fiber-optic bundles. The two fiber-optic bundles 19 and 20 are held together in a flexible enclosing tube 21 which leads both fiber-optic bundles into the laser and circuit container 22. Preferably the eye pieces are of the bi-focal type. The upper portion of each eye piece lens permits direct viewing. The bottom portion of each eye piece lens is the polished end of the optical fiber bundle and permits viewing through the laser beam, as shown in FIG. 3.

"Fiber optics" is a term describing the image pipe having a degree of flexibility, which is manufactured of thin cylindrical glass fibers of high optical quality. A single fiber, resembling a strand in a spider web, may be from 5 to 100 microns in diameter, but preferably is about 25 microns in diameter. Light entering one end of the fiber is transmitted to the other end by total internal reflection, with the transmission of a 40-inch length being between 40% to 70%. This percentage of transmission is somewhat affected by wave length but is substantially flat in the wave length band from .400 microns to 1.4 microns.

A large number of fibers are gathered together to form a bundle; for example, a suitable bundle would be one inch in diameter. The ends of the bundle are bonded together and an optical clear plastic is used to pot or glaze the ends of the fiber bundle. Each fiber is insulated with a glass coating having a lower refractive index than the refractive index of the fiber itself, the coating preventing light leaking from one fiber to another. The coating, called "cladding," results in every fiber constituting a core which is completely enclosed in its own clad. For example, the core may have a refractive index of about 1.62 and the cladding a refractive index of about 1.52. The entire bundle of fibers is encased in a flexible plastic or aluminum tubing to prevent the crushing or severe bending of the fibers. Each fiber is located in a precise pattern identical at either end, forming an oriented or "coherent" bundle. Each fiber transmits a tiny segment of the original image so that the image formed at the entrance face of the bundle is reproduced, as a mosaic, by the image at the exit face. Preferably, the cross-sectional shape of the bundle is rectangular, although other shapes may be used.

As shown in FIG. 2, the circuit includes the power supply 17, the power supply lines 18, a modulator circuit 26 and a laser 25. Preferably the laser is a laser which produces a coherent beam of light which is invisible, preferably about 9,050 A (IR), and is of the order of 5 KW peak power.

The laser 25 (light amplification by stimulated emission of radiation) is a device which operates in the infrared (invisible) and optical regions by amplification of electromagnetic waves by stimulated emission of radiation. In one type of laser the pumping radiation, for example, from a lamp, is introduced to a group of unexcited atoms in a material, for example, a ruby rod (crystalline aluminum oxide) positioned between a reflecting end plate and an opposed partially reflecting end plate. A wave oriented along the axis between the plates resonates between the plates to build up a strong oscillation and the output is nearly monochromatic.

The laser produces light which is nearly a plane wave and is spectrally coherent. To attain sufficient power and breadth of beam, a suitable laser is a solid-state electronically pumped (not optically pumped) laser which will produce about 1 watt, integrating the pulses to simulate a continuous source. A gas laser is not generally suitable due to its requirements for cooling and optical pumping, which make such a gas laser difficult to incorporate in a portable unit.

The width (breadth) of the laser beam (its diameter when the beam is round in cross-section) must be sufficient to illuminate objects. The beam must be sufficiently wide as to avoid cauterizing the eye of the viewer. For example, in cauterization the beam spot of 1 millimeter in diameter may be utilized, as in Gresser U.S. Pat. No. 3,096,767, which type of beam is unsuitable here. The beam diameter, in the present invention, is at a minimum, one-fourth of an inch in diameter, when it leaves the laser and is preferably spread by an optical lens to at least 2 inches in diameter, and preferably about 6 inches in diameter, at the object to be illuminated.

Using a broad beam of 2–6 inches, the following alternatives are available: (1) for the fire fighter to manually scan the room or area; (2) to provide machinery so that the scan is performed automatically; or (3) to use a somewhat diverging beam. The diverging beam is produced using a double convex IR lens after the electro-optical shutter 34, i.e., between shutter 34 and particles 38 and in the laser beam path. Depth perception is simulated by an optical delay, such as a solid glass member positioned in the optical path of one eye and omitted from the optical path of the other eye.

Preferably the laser utilized in the present embodiment is a semiconductor. In the semiconductor type of laser the free electrons in the conduction band are stimulated by pumping action, to recombine with holes in the valance band. The energy of recombination corresponds to the band gap and is radiated as optical or infrared light. A suitable semiconductor device uses gallium arsenide having a flat junction between the n-type and P-type materials. The reflecting and partially reflecting plates are the polished ends of the gallium arsenide crystal.

The preferred material for the laser is gallium arsenide crystals having a high photoluminescence efficiency, available from Laser Diode Laboratories, Inc., Metuchen, New Jersey. These crystals, in wafer form, are positioned in an array (matrix) in which each wafer is individually connected to an electrical network, including an oscillator, to pump the wafers electronically. The laser beam from a gallium-arsenide is not collimated in the same degree as a gas laser but is in a cone form as it is emitted from the laser. That cone form beam is collimated by a "laser illuminator." The gallium arsenide laser is composed of a number of crystals, each a point source. The array (matrix), which has a three-eighth-inch diameter, of crystals emits a cone shaped beam. The "laser illuminator" uses a large lens separated from the crystal array in order to collimate the laser beam. Preferably, a double-convex IR glass lens 2 inches in diameter is positioned 3–4 inches from the crystal array and within an enclosure. The modulator (electro-optical shutter 34) is also preferably of the same 2-inch diameter. A smaller diameter modulator (electro-optical shutter) may alternatively be employed by having an optical lens system to narrow the beam and subsequently expanding the beam by a double convex lens. Preferably the laser beam radiation is IR (infra-red) because (1) IR light travels through the particles with greater efficiency than visible light; and (2) the laser may use higher power for illumination purposes. However, when IR is used, the viewer must be an IR viewer to convert the IR to visible light, such a viewer being an image converter tube in place of lens 29. The oscillator circuit 26 is a high frequency circuit which pulses, i.e., gates, an electro-optical shutter 34, at a predetermined high frequency, for example, 1 million Hz. A suitable oscillator may be constructed by selecting a high frequency piezoelectric crystal of the desired frequency which controls an oscillator circuit. The piezoelectric crystal can be chosen at the selected oscillator frequency or alternatively the frequency of the piezoelectric crystal may be above or below the final oscillation frequency, in which case the crystal oscillator would have to be either multiplied or divided by known electronic techniques. The output of the piezoelectric crystal oscillator is amplified, for example, by a transistor oscillator of Darlington configuration, and the amplified pulses used to gate or charge the electro-optical shutter.

The ultra-fast pulsing of the light beam is made possible by the shutter 34. Preferably the shutter is an electro-optical device such as a Kerr cell or a laser beam modulator such as the device sold by Lasermetrics Inc., New Jersey, under the name of "electro-optic modulator," for example, a Pockells effect crystal. In a Kerr shutter a positive or negative birefringent liquid, such as carbon disulfate, is placed in a thin closed container having flat optically transparent and electrically conductive flat walls. The conductive walls form a condenser or alternatively a transparent condenser is placed in a glass cell of the same liquid. The light beam passes through the plates only when the plates are charged, the electric field causing a rotation of the plane of polarization.

The laser beam 30 goes to a double convex lens 35 which focuses it through a spatial filter 36 and to a collimating lens 37. The lens 35 enlarges the beam to the desired size. The laser beam 30 impinges on a beam splitting mechanism 27 which preferably is a beam splitter having a dichroic coating. The beam is split so that one part 31 goes straight through and a second part 32 is transmitted at a right angle. The straight part 31 goes to an optical shutter which is the high speed pulser.

The right angle beam 32 goes to a collecting lens 33 which is within the container 29. The collecting lens is a double convex lens one of whose sides is optically matched to the optically polished end of the fiber-optic bundle 19. The oscillator frequency is selected so that the shutter frequency gives the best results, taking into account the likely distance to be viewed and the type of smoke.

In a calculation of the shutter frequency, one may assume that the distance from the laser system to the object is $R$. Then the photon round trip is by definition:

$$V = \lim_{t \to 0} \frac{\Delta R}{\Delta t}$$

$$t = \frac{2}{V} \int_0^R dR \longrightarrow \frac{2R}{V} \quad V = \text{constant the speed of light}$$

In terms of frequency:

$$f = \frac{1}{t} = \frac{1}{\frac{2}{V} \int_0^R dR} = \frac{V}{2R} \quad \frac{\text{Photons}}{\text{Sec}}$$

$V/2R$ photons return to the laser system per second.

When the idealized smoke volume is present, which is assumed to center at $1/2\ R$, we assume back-scattered radiation is reflected from particles of smoke as if the particles were mirrors. For a photon back-scattered from a particle in the plane of $N_1$:

$$t_1 = \frac{2 N_1}{V}$$

For a particle back-scattered from a particle in the plane of $N_2$:

$$t_2 = \frac{2 N_2}{V}$$

In general, the real world situation is not this simple since the degree of scattering is a function of particle density, size and wave length of illumination. In addition, multiple interactions take place. Therefore, particles may be impeded on the way back to the laser system. Light, which initially penetrates the smoke volume, undergoes the same scattering process; consequently, the light returning to the laser system contains forward scatter. To compensate for these factors, we utilize a time average:

$$t_{AV} = \frac{t_1 + t_2}{2} = \frac{1}{2}\left(\frac{2 N_1}{V} + \frac{2 N_2}{V}\right)$$

$$f_{AV} = \frac{V}{N_1 + N_2} \quad V = \text{constant speed of light}$$

In one example, we let $R = 20$ ft. and $N = 10$ ft. so that $f = 5.0 \times 10^7$ photons/sec. return to the laser system, which are signal photons.

In this example $f_{AV} = 1.0 \times 10^8$ photons/sec. of back-scattered photon return to the laser system during the same time period. In this example it is seen that out of every three photons returning per unit time, two are noise and one is signal.

The time it takes for back-scattered radiation to return is $t_{AV} = 10^{-8}$ sec. To block this back-scattered radiation, the shutter is closed every $10^{-8}$ sec., the frequency of the shutter is $f_s = 10^8$ Pulses/Sec. The shutter is open for as long a period as it is closed with that frequency.

It is true that if a signal and noise photons arrive at the shutter simultaneously, the signal is lost as well as the noise. This is a situation which must be tolerated for a direct visual system and, since back-scatter is the predominant reaction, it appears that more noise than signal is blocked, thereby improving the ability to see through smoke.

The theory of operation of the instrument is given below. The wave length of the laser beam is selected so that it penetrates the smoke the required distance. For example, the wave length is selectable by having two or more laser devices only one of which is used, depending upon the characteristics of the smoke. If one laser device is to be used, its wave length may be selected to penetrate the particle size most often found and most difficult to see through, for example, at $10^8$ pulses per second.

The coherent laser beam enters the smoke and the following physical processes occur: (a) some of the light is absorbed by the smoke particles 38 (the dense medium); (b) some of the light is scattered (reflected) by the smoke particles 38. Much of the scattered light is directed, at 180°, back to the laser, forming a "back-scattered" light; (c) some of the light is reflected by the object 39 and is used to view the object.

The major difficulty is that the noise, i.e., the back-scattered light, may hinder reception of the signal, i.e., the light reflected from the object, see H.C. van de Huls "Light Scattering by Small Particles," 1957. The harmful effect of back-scattering is dealt with by the selection of the proper wave length of the laser beam, as discussed above, and by the fast pulsing of the beam.

The effect of the high frequency shutter is not a true range gating effect such as is described in U.S. Pat. No. 3,380,358 to Neuman or U.S. Pat. No. 3,294,002 to Vitkine, because, in the system of the present invention, there is no timing control over the opening of the shutter using a delay means. Alternatively, the shutter 34 may, by means of a delay line, obtain that type of range gating effect or may be synchronized to open in unison with pulses from the laser.

The high frequency pulsing of the laser beam has been described, in the above embodiment, by means of an electro-optical shutter which is distinct from the lamp, or other energy source, which provides the pumping of the laser. The laser will be "pulsed" or "pumped" by an oscillatory source of energy to produce its coherent beam. The beam will then be "pulsed" by a shutter at a high frequency. However, modifications may be made in the present invention. For example, instead of a shutter, a modulator may vary the energy of the laser at a high frequency, i.e., the laser beam may vary at a sinusoidal fashion instead of in sequential quantum of light. As another alternative, the pumping frequency of the oscillator energizing the laser may be controlled so that the laser beam is in the form of sequential bursts (quanta) of light, in which event a subsequent shutter is not required.

As another possible change, other image transfer means may be substituted for the fiber bundles. Image intensifying means, such as the high voltage "sniperscope," is preferably employed to enhance the clarity of the image, the intensifying means being part of the image transfer means.

For safety and health reasons, it is preferable for the eye not to directly view a coherent laser light beam. Attenuating filters will be interposed in the path of the laser beam directed to the eye piece to avoid any such harmful effects. Suitable attenuating filters, constructed of chemically treated plastic sheets to protect the eye from high energy density laser beams, are available from Glendale Optical Co. of Woodbury, New York.

The present application, although directed to portable equipment and to vision through a dense atmosphere, is not limited thereto. For example, the same type of equipment, using a laser and sighting along the laser beam, may be used in non-portable equipment, for example, on a ship, to sight through fog, using IR, or on a submarine to sight through water, using "green" light rather than IR. The problem of back-scattering at close range is sometimes called "veiling luminance." Equipment of the present application may be combined with other known techniques, such as gating the observing transducer with a delay synchronized with the pulsed laser, as described above (range gating) to avoid veiling luminance at longer distances, for example, sighting through fog.

We claim:

1. An instrument for viewing of objects through a particle laden atmosphere by an observer, comprising a viewing means, an optical image transfer means connected to said viewing means, a laser means producing a coherent beam of light having a width of at least 2 inches at the object viewed, optical beam splitting means positioned in said laser beam to divide said laser beam into two differently directed light beams, means to optically couple said optical image transfer means to said beam splitting means to receive the portion of the laser beam reflected from the viewed object so that the observer views the object along and within the laser beam through the beam splitting means and sees the object by the reflected light of the laser beam, and means to vary the intensity of said laser beam at a high frequency rate.

2. An instrument as in claim 1 wherein said optical image transfer means comprises a fiber bundle of oriented strands of glass fiber.

3. An instrument as in claim 1 wherein said viewing means is a face mask containing an eye piece.

4. An instrument as in claim 1 wherein said laser is a solid-state electronically pumped laser.

* * * * *